(12) United States Patent
Hsiung (10) Patent No.: US 8,977,164 B2
(45) Date of Patent: Mar. 10, 2015

(54) FIXING ELEMENT FOR FIXING COVERS, COVER DEVICE AND MULTIFUNCTION PRINTER

(75) Inventor: Chang-Kai Hsiung, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 286 days.

(21) Appl. No.: 13/615,708

(22) Filed: Sep. 14, 2012

(65) Prior Publication Data

US 2014/0021839 A1 Jan. 23, 2014

(30) Foreign Application Priority Data

Jul. 18, 2012 (TW) .............................. 101125873 A (51) Int. Cl.
*G03G 15/00* (2006.01)
*H04N 1/00* (2006.01)
*G03G 21/16* (2006.01)

(52) U.S. Cl.
CPC ... *H04N 1/00554* (2013.01); *G03G 2221/1678* (2013.01); *G03G 21/1623* (2013.01)
USPC ............................ 399/125; 399/379; 399/380

(58) Field of Classification Search
CPC .......... H04N 1/00551; H04N 1/00554; G03G 21/1623; G03G 21/1647; G03G 2221/1678
USPC ......................................... 399/125, 279–380
See application file for complete search history.

(56) References Cited

U.S. PATENT DOCUMENTS

2006/0222435 A1 10/2006 Ha et al.
2007/0195381 A1* 8/2007 Yamazaki et al.

* cited by examiner

*Primary Examiner* — David Gray
*Assistant Examiner* — Laura Roth
(74) *Attorney, Agent, or Firm* — Jianq Chyun IP Office (57) ABSTRACT

A fixing element, a cover device and a multifunction printer are provided. The multifunction printer includes a machine body, the cover device and the fixing element. The cover device is disposed on the machine body and includes a first cover, a second cover and a third cover, wherein the second cover is between the first cover and the third cover. The fixing element passes through and is fixed on the second cover. The first cover and the second cover open relative to the third cover when the fixing element locks the first cover and the second cover, and the first cover opens relative to the second cover and the third cover when the fixing element locks the second cover and the third cover.

31 Claims, 6 Drawing Sheets

FIXING ELEMENT FOR FIXING COVERS, COVER DEVICE AND MULTIFUNCTION PRINTER

CROSS-REFERENCE TO RELATED APPLICATION

This application claims the priority benefit of Taiwan application serial no. 101125873, filed on Jul. 18, 2012. The entirety of the above-mentioned patent application is hereby incorporated by reference herein and made a part of this specification.

BACKGROUND

1. Field of the Invention

The invention relates to a fixing element, a cover device and a multifunction printer, and more particularly, to a fixing element which locks two of three layers of covers together, a cover device using the fixing element, and a multifunction printer using the cover device.

2. Description of Related Art

Regarding ordinary scanners, photocopiers or multifunction printers, etc., upper covers thereof may open and close relative to machine bodies. Take a multifunction printer as an example. Because of a greater volume, the multifunction printer is usually placed at corners of an office to allow office workers to copy or scan documents easily.

A scanner of the multifunction printer is disposed on the machine body of the multifunction printer, wherein the scanner includes a scan lid and a scan base, and a mid chassis is disposed on the machine body to fix the scan base. When the scan base opens relative to the machine body, elements in the machine body are exposed to allow the maintenance staff or users to perform maintenance or replacement of the elements (such as an ink cartridge) in the machine body of the multifunction printer easily.

Usually, when the users intend to use the scanning function of the scanner, the users only have to open the scan lid relative to the scan base. When intending to perform maintenance or replacement of the elements in the machine body, the users have to open the scan lid and the scan base at the same time. However, if an element that locks the scan lid, the scan base or the mid chassis together is not disposed, the users may open the scan base altogether even when the users only have to open the scan lid.

In current multifunction printers, to lock two of the scan lid, the scan base or the mid chassis together, two fixing elements are disposed, wherein one is for locking the scan lid and the scan base together, and the other is for locking the scan base and the mid chassis together.

SUMMARY OF THE INVENTION

The invention provides a fixing element which changes covers to be locked together according to a change of a position.

The invention provides a cover device using the fixing element and thus allows two of three layers of covers of the cover device to be locked together.

The invention provides a multifunction printer using the above cover device.

The invention provides a fixing element adapted for locking two of three layers of covers of a device together, and the fixing element includes a cylinder, a first locking hook, a guiding column, and a second locking hook, wherein the first locking hook is connected to the cylinder, and a locking direction of the first locking hook is parallel to an axial direction of the cylinder. The guiding column is connected to the cylinder, and the guiding column and the first locking hook are located on opposite sides of the cylinder. The second locking hook is connected to the cylinder and located beside the guiding column, and the second locking hook and the first locking hook are located on opposite sides of the cylinder, wherein a locking direction of the second locking hook is perpendicular to a radial direction of the cylinder.

The invention further provides a cover device including a first cover, a second cover, a third cover and a fixing element, wherein the second cover is between the first cover and the third cover. The fixing element passes through and is fixed on the second cover. The first cover and the second cover open relative to the third cover when the fixing element locks the first cover and the second cover, and the first cover opens relative to the second cover and the third cover when the fixing element locks the second cover and the third cover.

The invention further provides a multifunction printer including a machine body, a cover device and a fixing element. The cover device is disposed on the machine body and includes a first cover, a second cover and a third cover, wherein the second cover is between the first cover and the third cover. The fixing element passes through and is fixed on the second cover. The first cover and the second cover open relative to the third cover when the fixing element locks the first cover and the second cover, and the first cover opens relative to the second cover and the third cover when the fixing element locks the second cover and the third cover.

Based on the above, in the invention, the locking direction of the first locking hook and the locking direction of the second locking hook are towards different directions and thus are able to lock two of the three layers of the covers together at different positions. By applying the cover device with the fixing element in the multifunction printer, the scan base and the mid chassis are locked together when the scan lid opens relative to the scan base. When the inner of the machine body has to be exposed to allow the performance of maintenance or replacement of elements, the fixing element locks the scan lid and the scan base together.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF EMBODIMENTS

Figure 1:
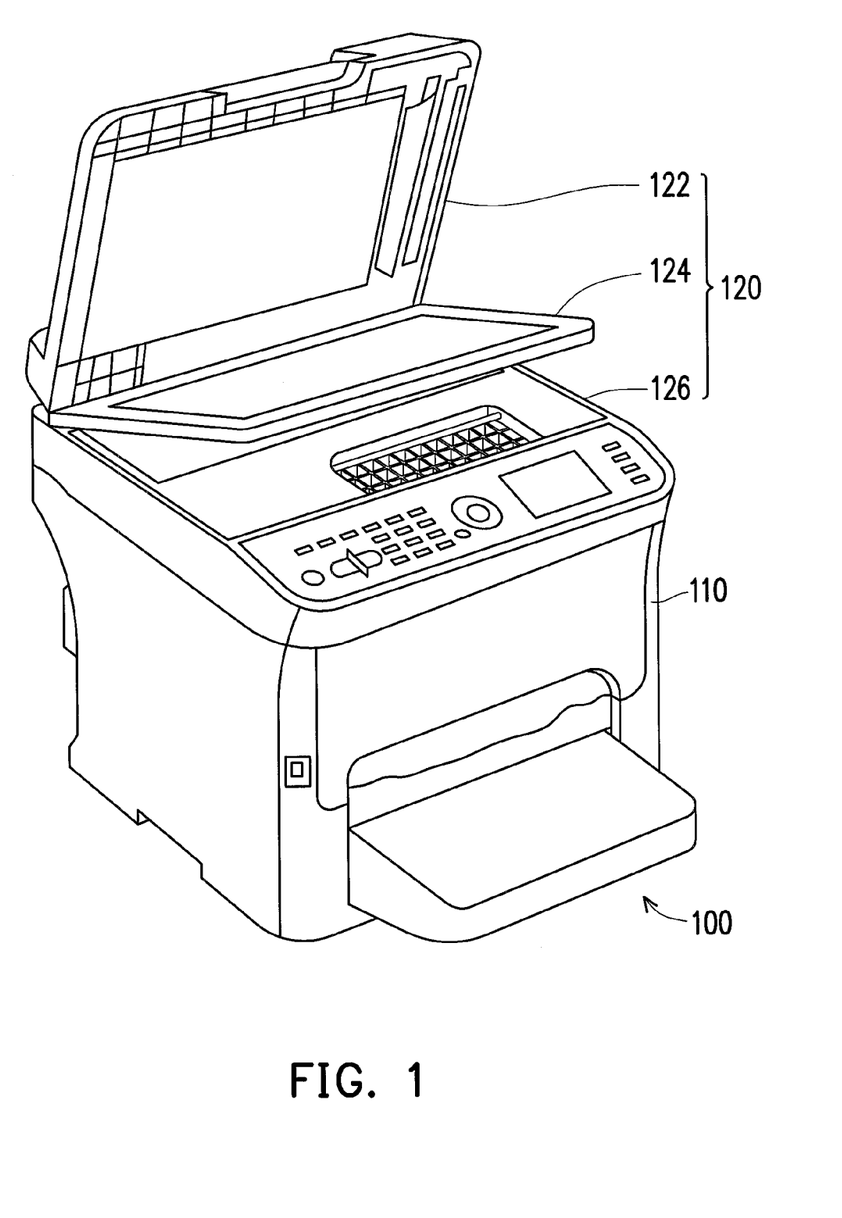
FIG. 1 is a schematic view of a multifunction printer according to an embodiment of the invention.
Figure 2:
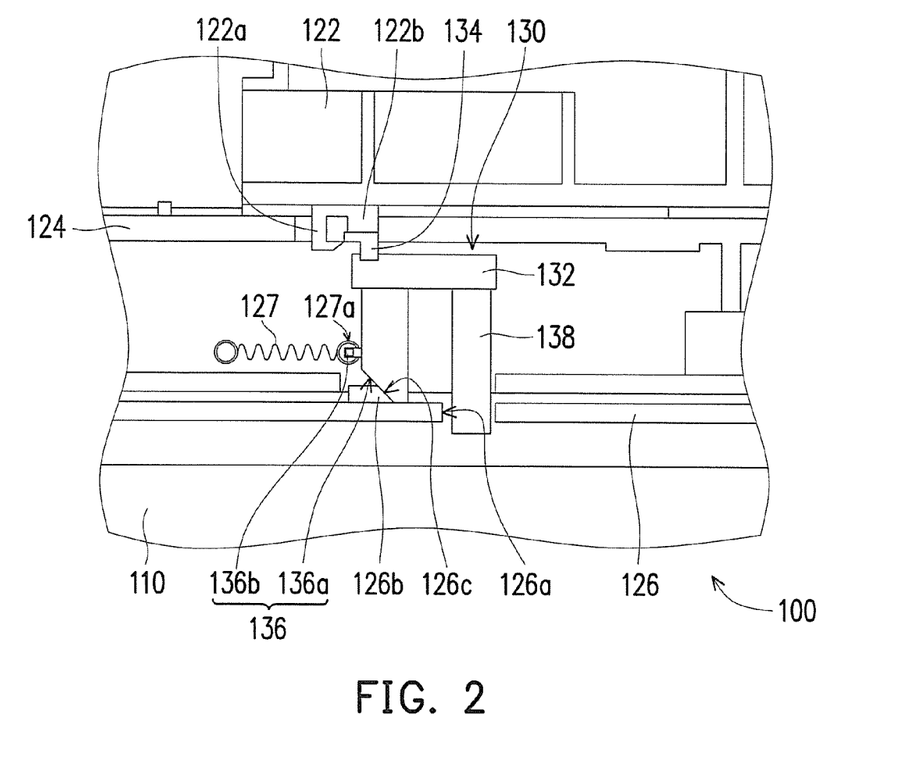
FIG. 2 is a schematic partial view of FIG. 1.
Figure 3:
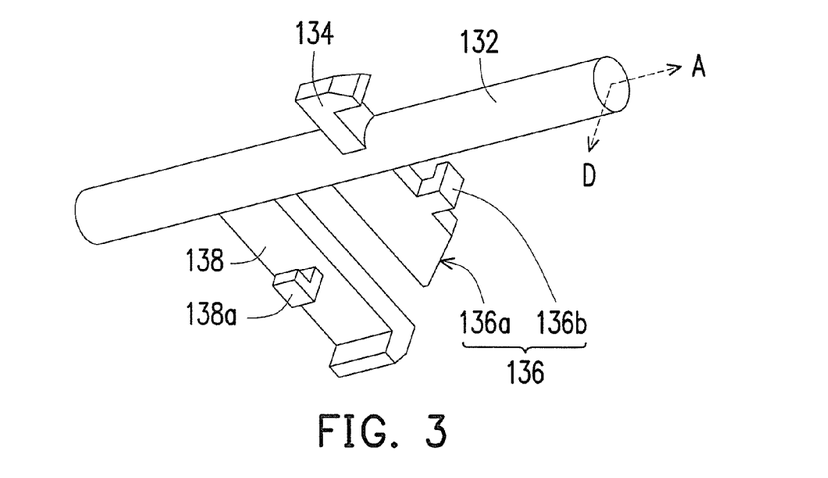
FIG. 3 is a three-dimensional view of a fixing element shown in FIG. 2.

FIG. 1 is a schematic view of a multifunction printer according to an embodiment of the invention, and FIG. 2 is a schematic partial view of FIG. 1, and FIG. 3 is a three-dimensional view of a fixing element shown in FIG. 2. Referring to FIGS. 1, 2 and 3, a multifunction printer 100 includes a machine body 110, a cover device 120 and a fixing element 130. The cover device 120 is disposed on the machine body 110 and includes a first cover 122, a second cover 124 and a third cover 126, wherein the second cover 124 is between the first cover 122 and the third cover 126. The fixing element 130 passes through and is fixed on the second cover 124.

Based on the above, in the present embodiment, the first cover 122 is a scan lid, and the second cover 124 is a scan base, wherein when a scanning procedure is performed, a user may open the first cover 122 and place documents to be scanned on the scan base. The third cover 126 is a mid chassis and may open relative to the machine body 110 to allow the maintenance staff to perform maintenance or replacement of the elements in the machine body 110 easily.

The first cover 122 includes a first limiting portion 122a, and the third cover 126 includes a second limiting portion 126a, and in the present embodiment, the first limiting portion 122a is a locking hook, and the second limiting portion 126a is an opening. In addition, the third cover 126 further includes a guiding bump 126b, and the guiding bump 126b includes a guiding plane 126c. With a guiding inclined plane 136a of a guiding column 136 working in conjunction with the guiding plane 126c of the guiding bump 126b, a position of the fixing element 130 may be changed relative to the first limiting portion 122a.

Figure 4:
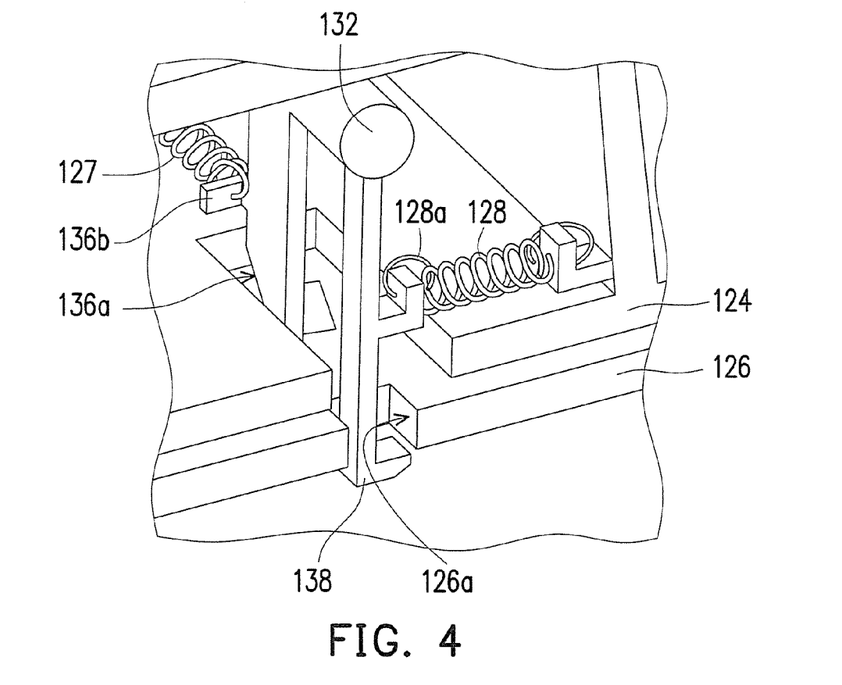
FIG. 4 is a schematic view of the multifunction printer shown in FIG. 2 from another perspective.

FIG. 4 is a schematic view of the multifunction printer shown in FIG. 2 from another perspective. Referring to FIGS. 2, 3 and 4, the fixing element 130 includes a cylinder 132, a first locking hook 134, the guiding column 136, and a second locking hook 138, wherein the first locking hook 134 is connected to the cylinder 132, and a locking direction of the first locking hook 134 is parallel to an axial direction A of the cylinder 132. The guiding column 136 is connected to the cylinder 132, and the guiding column 136 and the first locking hook 134 are located on opposite sides of the cylinder 132. The second locking hook 138 is connected to the cylinder 132 and located beside the guiding column 136, and the second locking hook 138 and the first locking hook 134 are located on opposite sides of the cylinder 132, wherein a locking direction of the second locking hook 138 is perpendicular to a radial direction D of the cylinder 132. The guiding column 136 includes the guiding inclined plane 136a, and the guiding inclined plane 136a inclines along the axial direction A.

Figure 5:
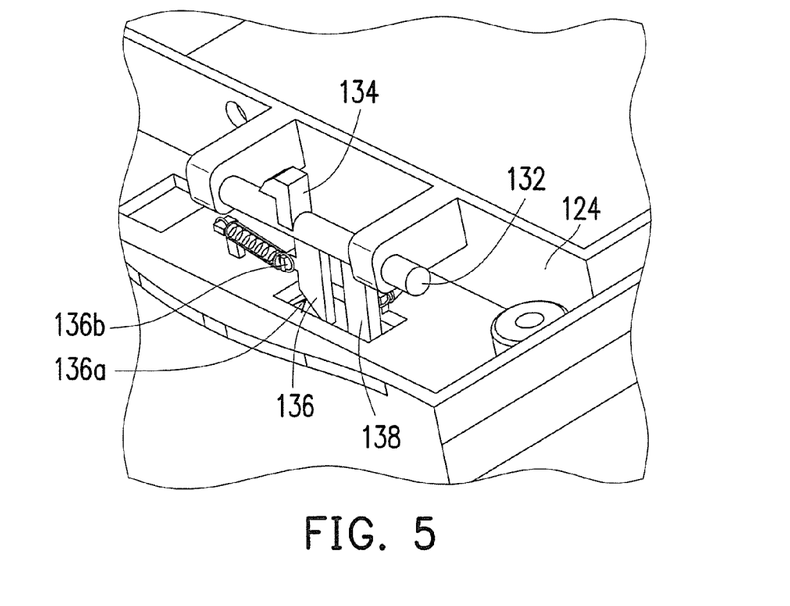
FIG. 5 is a schematic view illustrating that the fixing element passes through and is fixed on a second cover.

FIG. 5 is a schematic view illustrating the fixing element passing through and being fixed on the second cover. Referring to FIGS. 2, 4 and 5, two ends of the cylinder 132 of the fixing element 130 are sleeved on the structure of the second cover 124, so the fixing element 130 may rotate with the axial direction A of the cylinder 132 as a center of rotation, and the guiding column 136 and the second locking hook 138 passes through an opening (not shown) of the second cover 124. In addition, the cover device 120 further includes a first spring 127, and the guiding column 136 further includes a third locking hook 136b, and an end 127a of the first spring 127 is connected to the third locking hook 136b, and a locking direction of the third locking hook 136b is different from the locking direction of the first locking hook 134. Furthermore, the cover device 120 further includes a second spring 128, and the second locking hook 138 further includes a fourth locking hook 138a, and an end 128a of the second spring 128 is connected to the fourth locking hook 138a, wherein a locking direction of the fourth locking hook 138a is different from the locking direction of the second locking hook 138. With this kind of structural design of the fixing element 130 in conjunction with the disposition of the first spring 127, the second spring 128 and the guiding bump 126b, the position of the fixing element 130 may be changed to determine whether the first locking hook 134 of the fixing element 130 is locked with the first limiting portion 122a of the first cover 122 or the second locking hook 138 of the fixing element 130 is to be locked with the second limiting portion 126a of the third cover 126. In this way, by using one fixing element 130, the first cover 122 and the second cover 124 are locked together, or the second cover 124 and the third cover 126 are locked together.

How the fixing element 130 makes the first cover 122 and the second cover 124 locked together or how the fixing element 130 makes the second cover 124 and the third cover 126 locked together are described below.

Referring to FIGS. 2 and 4, when the first cover 122, the second cover 124 and the third cover 126 are locked to each other, the fixing element 130 is in an unlocking position. At this time, the guiding inclined plane 136a of the guiding column 136 of the fixing element 130 contacts the guiding plane 126c of the guiding bump 126b, and the guiding inclined plane 136a is limited by the guiding plane 126c. The first spring 127 stores a resilience, and the first locking hook 134 is not locked with the first limiting portion 122a, so that the first cover 122 and the second cover 124 are in an unlocking state. Additionally, the first cover 122 further includes a third limiting portion 122b located beside the first limiting portion 122a, wherein the third limiting portion 122b is a limiting bump to protrude against the first locking hook 134 of the fixing element 130, and thus the second locking hook 138 is not locked with the second limiting portion 126a, either.

Figure 6:
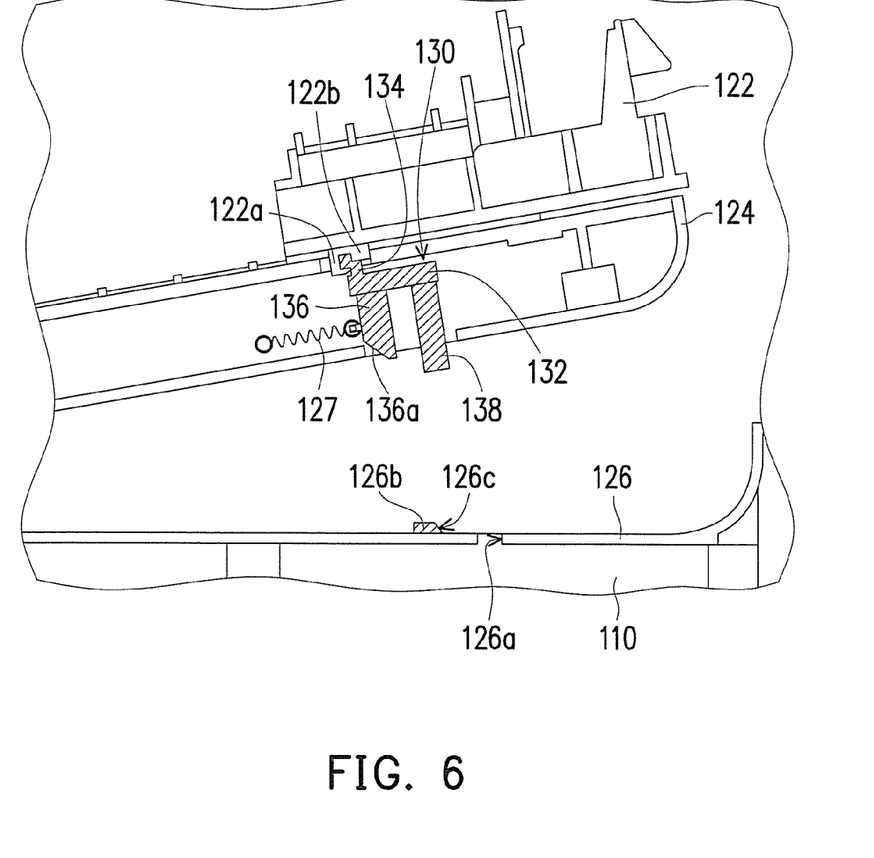
FIG. 6 is a schematic view illustrating that a first cover is locked with the second cover and opens relative to a third cover.

FIG. 6 is a schematic view illustrating that the first cover is locked with the second cover and opens relative to the third cover. Referring to FIG. 6, when a user lifts the second cover 124, at this time, because of the own weight of the first cover 122, the first cover 122 still leans on the second cover 124, and the third limiting portion 122b still poses a position limitation on the first locking hook 134, so that the fixing element 130 is not able to rotate with the axial direction A (shown in FIG. 3) of the cylinder 132 as the center of rotation. Therefore, the second locking hook 138 of the fixing element 130 is not locked with the second limiting portion 126a, so that the second cover 124 may disengage from the third cover 126 smoothly. As the second cover 124 is disengaging from the third cover 126, the guiding inclined plane 136a of the guiding column 136 also disengages from the guiding plane 126c of the guiding bump 126b. Therefore, a position limitation on the guiding column 136 and the guiding bump 126b is lifted, and the resilience of the first spring 127 makes the fixing element 130 draw relatively near to the first limiting portion 122a along the axial direction A (shown in FIG. 3) of the cylinder 132. Thus, the first locking hook 134 is locked with the first limiting portion 122a, and the first cover 122 and the second cover 124 are locked together.

Figure 7:
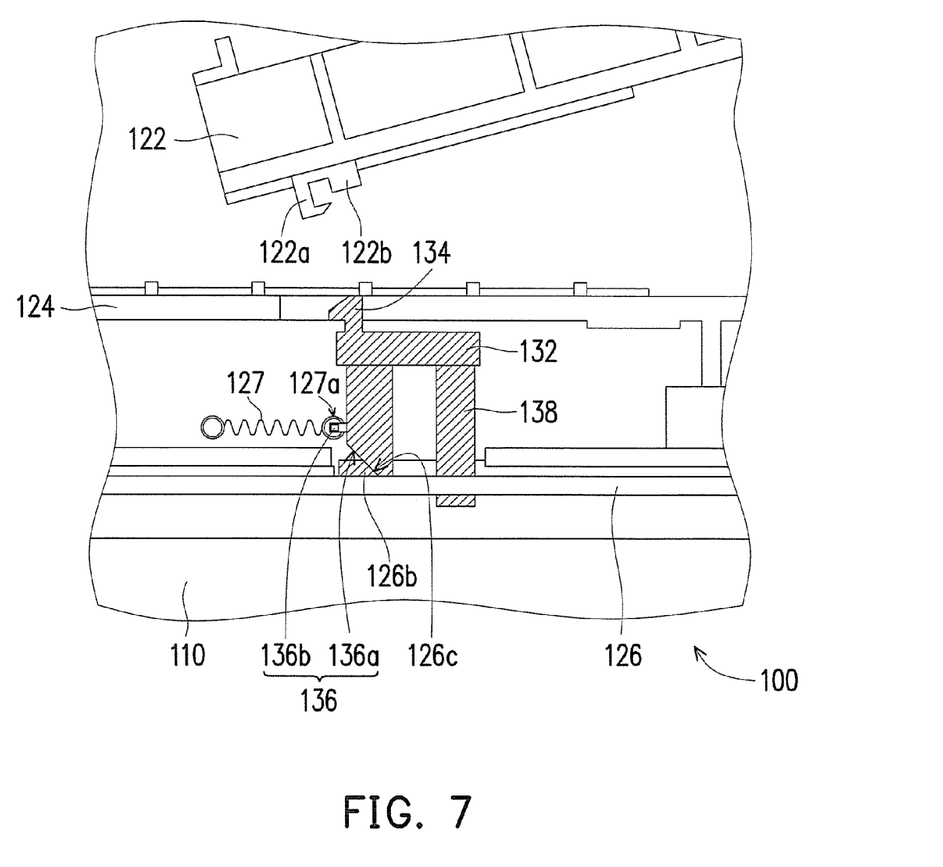
FIG. 7 is a schematic view illustrating that the second cover is locked with the third cover and that the first cover opens relative to the second cover and the third cover which are locked together.
Figure 8:
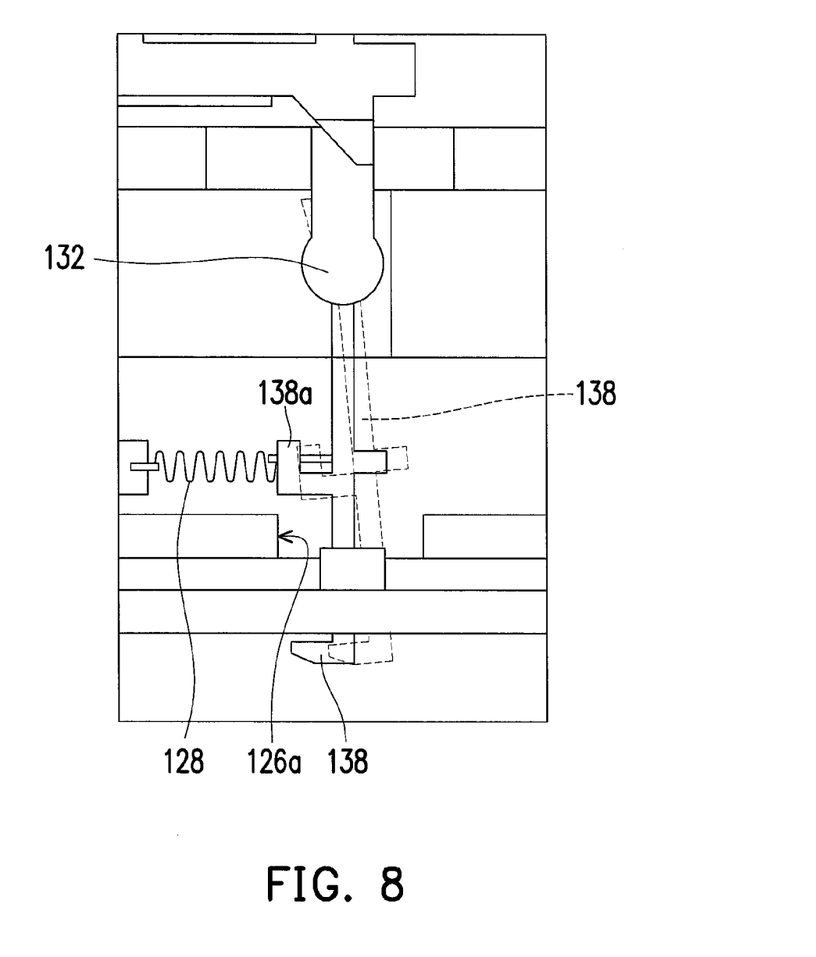
FIG. 8 is a schematic view illustrating that the fixing element rotates with an axial direction of a cylinder as a center of rotation to make a second locking hook locked with a second limiting portion.

FIG. 7 is a schematic view illustrating that the second cover is locked with the third cover and that the first cover opens relative to the second cover and the third cover which are locked together, and FIG. 8 is a schematic view illustrating that the fixing element rotates with the axial direction of the cylinder as the center of rotation to make the second locking hook locked with the second limiting portion. Referring to FIGS. 7 and 8, when the first cover 122 is opened relative to the second cover 124, the guiding inclined plane 136a of the guiding column 136 is still under a position limitation posed by the guiding plane 126c of the guiding bump 126b. Therefore, the fixing element 130 does not move along the axial direction A (shown in FIG. 3).

At this time, the third limiting portion 122b of the first cover 122 lifts the position limitation on the first locking hook 134 of the fixing element 130, and the resilience of the second spring 128 makes the fixing element 130 rotate clockwise with the axial direction A (shown in FIG. 3) of the cylinder 132 as the center of rotation. Thus, the second locking hook 138 is locked with the second limiting portion 126a, and the second cover 124 and the third cover 126 are locked together.

The clockwise direction is exemplified by the rotation direction along which the fixing element 130 in FIG. 8 rotates when driven by the second spring 128 and is not used to limit the invention. People of ordinary skill in the art can learn that when the viewing angle varies, descriptions of relative positions and rotation directions of the elements also vary.

Based on the above, in the invention, the locking direction of the first locking hook and the locking direction of the second locking hook are towards different directions and thus, with the guidance and position limitation of the guiding bump and the guiding column and with the disposition of the first spring and the second spring, the fixing element are able to lock the first cover and the second cover together or the second cover and the third cover together at different positions through the structural limit and drive.

By applying the cover device with the fixing element in the multifunction printer, when the user opens the scan lid relative to the scan base, the scan base and the mid chassis are automatically locked together because of the design of this mechanism, which is convenient for the user. When the inner of the machine body has to be exposed to allow the performance of maintenance or replacement of elements, the fixing element automatically locks the scan lid and the scan base together through the scan base opening relative to the machine body. In brief, through the structural design of the fixing element of the invention and by using the fixing element in the cover device or in the multifunction printer, the number of fixing element is less and the effect that conventionally requires two fixing elements to achieve is still achieved.

Although the invention has been described with reference to the above embodiments, they are not intended to limit the invention. It is apparent to people of ordinary skill in the art that modifications and variations to the invention may be made without departing from the spirit and scope of the invention. In view of the foregoing, the protection scope of the invention will be defined by the attached claims.

What is claimed is:

1. A fixing element, comprising:
   a cylinder;
   a first locking hook connected to the cylinder, wherein a locking direction of the first locking hook is parallel to an axial direction of the cylinder;
   a guiding column connected to the cylinder, wherein the guiding column and the first locking hook are located on opposite sides of the cylinder; and
   a second locking hook connected to the cylinder and located beside the guiding column, wherein the second locking hook and the first locking hook are located on opposite sides of the cylinder, and a locking direction of the second locking hook is perpendicular to a radial direction of the cylinder.

2. The fixing element according to claim 1, wherein the guiding column comprises a guiding inclined plane, and the guiding inclined plane inclines along the axial direction.

3. The fixing element according to claim 1, wherein the guiding column further comprises a third locking hook, and an end of a first spring is connected to the third locking hook.

4. The fixing element according to claim 3, wherein a locking direction of the third locking hook is different from the locking direction of the first locking hook.

5. The fixing element according to claim 1, wherein the second locking hook further comprises a fourth locking hook, and an end of a second spring is connected to the fourth locking hook.

6. The fixing element according to claim 5, wherein a locking direction of the fourth locking hook is the same as the locking direction of the second locking hook.

7. A cover device, comprising:
   a first cover, a second cover and a third cover, wherein the second cover is between the first cover and the third cover; and
   a fixing element passing through and being fixed on the second cover, wherein the fixing element comprises:
   a cylinder;
   a first locking hook connected to the cylinder, wherein a locking direction of the first locking hook is parallel to an axial direction of the cylinder, and the first locking hook is for being fastened with the first limiting portion of the first cover;
   a guiding column connected to the cylinder, wherein the guiding column and the first locking hook are located on opposite sides of the cylinder; and
   a second locking hook connected to the cylinder and located beside the guiding column, wherein the second locking hook and the first locking hook are located on opposite sides of the cylinder, a locking direction of the second locking hook is perpendicular to a radial direction of the cylinder, and the second locking hook is for being fastened with the second limiting portion,
   the first cover and the second cover open relative to the third cover when the fixing element locks the first cover and the second cover, and the first cover opens relative to the second cover and the third cover when the fixing element locks the second cover and the third cover.

8. The cover device according to claim 7, wherein the first cover comprises a first limiting portion, and the third cover comprises a second limiting portion.

9. The cover device according to claim 8, wherein the first limiting portion or the second limiting portion is a locking hook or an opening.

10. The cover device according to claim 8, wherein the first cover further comprises a third limiting portion located beside the first limiting portion.

11. The cover device according to claim 10, wherein the third limiting portion is a limiting bump.

12. The cover device according to claim 8, wherein the guiding column comprises a guiding inclined plane, and the guiding inclined plane inclines along the axial direction.

13. The cover device according to claim 12, wherein the third cover further comprises a guiding bump, the guiding bump comprises a guiding plane, and the guiding inclined plane of the guiding column contacts the guiding plane.

14. The cover device according to claim 8, further comprising a first spring, the guiding column further comprising a third locking hook, wherein an end of the first spring is connected to the third locking hook.

15. The cover device according to claim 14, wherein a locking direction of the third locking hook is different from the locking direction of the first locking hook.

16. The cover device according to claim 8, further comprising a second spring, the second locking hook further comprising a fourth locking hook, wherein an end of a second spring is connected to the fourth locking hook.

17. The cover device according to claim 16, wherein a locking direction of the fourth locking hook is the same as the locking direction of the second locking hook.

18. A multifunction printer, comprising:
a machine body;
a cover device disposed in the machine body and comprising a first cover, a second cover and a third cover, wherein the second cover is between the first cover and the third cover; and
a fixing element passing through and being fixed on the second cover, wherein the fixing element comprises:
a cylinder;
a first locking hook connected to the cylinder, wherein a locking direction of the first locking hook is parallel to an axial direction of the cylinder, and the first locking hook is for being fastened with the first limiting portion of the first cover;
a guiding column connected to the cylinder, wherein the guiding column and the first locking hook are located on opposite sides of the cylinder; and
a second locking hook connected to the cylinder and located beside the guiding column, wherein the second locking hook and the first locking hook are located on opposite sides of the cylinder, a locking direction of the second locking hook is perpendicular a radial direction of the cylinder, and the second locking hook is for being fastened with the second limiting portion,
the first cover and the second cover open relative to the third cover when the fixing element locks the first cover and the second cover, and the first cover opens relative to the second cover and the third cover when the fixing element locks the second cover and the third cover.

19. The multifunction printer according to claim 18, wherein the first cover comprises a first limiting portion, and the third cover comprises a second limiting portion.

20. The multifunction printer according to claim 19, wherein the first limiting portion or the second limiting portion is a locking hook or an opening.

21. The multifunction printer according to claim 19, wherein the first cover further comprises a third limiting portion located beside the first limiting portion.

22. The multifunction printer according to claim 21, wherein the third limiting portion is a limiting bump.

23. The multifunction printer according to claim 18, wherein the guiding column comprises a guiding inclined plane, and the guiding inclined plane inclines along the axial direction.

24. The multifunction printer according to claim 23, wherein the third cover further comprises a guiding bump, the guiding bump comprises a guiding plane, and the guiding inclined plane of the guiding column contacts the guiding plane.

25. The multifunction printer according to claim 18, wherein the cover device further comprises a first spring, the guiding column further comprises a third locking hook, and an end of the first spring is connected to the third locking hook.

26. The multifunction printer according to claim 25, wherein a locking direction of the third locking hook is different from the locking direction of the first locking hook.

27. The multifunction printer according to claim 18, wherein the cover device further comprises a second spring, the second locking hook further comprises a fourth locking hook, and an end of the second spring is connected to the fourth locking hook.

28. The multifunction printer according to claim 27, wherein a locking direction of the fourth locking hook is the same as the locking direction of the second locking hook.

29. The multifunction printer according to claim 18, wherein the first cover is a scan lid.

30. The multifunction printer according to claim 18, wherein the second cover is a scan base.

31. The multifunction printer according to claim 18, wherein the third cover is a mid chassis.

* * * * *